(12) United States Patent
Powers

(10) Patent No.: US 6,557,003 B1
(45) Date of Patent: Apr. 29, 2003

(54) METHOD AND APPARATUS FOR MULTIPLE AGENT COMMITMENT TRACKING AND NOTIFICATION

(75) Inventor: James Karl Powers, Carlsbad, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 09/537,857

(22) Filed: Mar. 28, 2000

Related U.S. Application Data

(62) Division of application No. 09/071,467, filed on Apr. 30, 1998, now Pat. No. 6,044,368.

(51) Int. Cl.[7] .............................................. G06F 17/30
(52) U.S. Cl. ..................... 707/102; 715/501.1
(58) Field of Search ........................ 707/102; 715/501.1

(56) References Cited

U.S. PATENT DOCUMENTS

| | | | | |
|---|---|---|---|---|
| 5,521,841 A | * | 5/1996 | Arman et al. ............... 345/723 |
| 5,721,827 A | * | 2/1998 | Logan et al. ............... 709/217 |
| 5,778,378 A | * | 7/1998 | Rubin ..................... 707/103 R |
| 5,907,837 A | * | 5/1999 | Ferrel et al. .................... 707/3 |
| 6,044,368 A | * | 3/2000 | Powers ........................... 707/2 |
| 6,199,076 B1 | * | 3/2001 | Logan et al. ............. 715/501.1 |
| 6,199,082 B1 | * | 3/2001 | Ferrel et al. ................ 715/522 |
| 6,272,150 B1 | * | 8/2001 | Hrastar et al. .............. 370/486 |
| 6,343,738 B1 | * | 2/2002 | Ogilvie ........................ 235/381 |
| 6,397,251 B1 | * | 5/2002 | Graf ........................... 709/225 |

* cited by examiner

Primary Examiner—Wayne Amsbury
(74) Attorney, Agent, or Firm—Donald R. Boys; Central Coast Patent Agency, Inc.

(57) ABSTRACT

A system for tracking client contacts for a host organization utilizes a multimedia database and a user interface at a connected computer device. The database stores client communications as full content, and relates contacts by issue, and the user interface displays client contact communications as objects, such as icons, in issue related chronological strings. In a preferred embodiment the interface also provides an input facility for a host agent to select appropriate responses to client communications, to make commitments for response, to assign responsibility for commitments, and to notify personnel effected by entered commitments in various ways, such as reminders. Other notifications include fulfilled and unfulfilled commitments.

26 Claims, 3 Drawing Sheets

METHOD AND APPARATUS FOR MULTIPLE AGENT COMMITMENT TRACKING AND NOTIFICATION

This application is a division of application Ser. No. 09/071,467, filed Apr. 30, 1998, now U.S. Pat. No. 6,044,368.

FIELD OF THE INVENTION

The present invention is in the field of multimedia communications including conventional telephony and Data Network Telephony (DNT), and pertains more particularly to methods and apparatus for tracking order of communications related to specific issues, including commitments made and fulfillment of the commitments.

BACKGROUND OF THE INVENTION

Large organizations increasingly rely on communication centers known as call centers for dealing with clients and customers. Such call centers handle and distribute conventional telephone calls to agents according to various business plans, in many instances are adapted as multimedia centers to handle communication of many sorts, such as e-mail, voice mail, data network telephony (DNT) such as Internet phone calls, conventional phone calls, and the like. The same organizations increasingly rely on digital-network communication technologies to enhance and expedite communication both internally and externally. More and more companies are linking to digital communication networks because such networks enhance an organization's ability to operate more quickly and efficiently. Such networks, weather local area networks (LAN) or wide area networks (WAN), or both, link company executives, agents, service representatives, and the like to each other and to the outside world through their computerized workstations. Such individuals that are linked via digital network may practice many different forms of communication over the networks. E-mail, fax, video phone, data phone, video mail, and other forms of digital communication are possible.

Of particular interest for the purpose of the present patent application is communication between large organizations and clients of those organizations, for example companies selling technically sophisticated products, and customers of such companies.

Successful communication between clients or customers and corporate representatives (agents) of a large organization is paramount to the well being of such an organization. For example, business contact information must be recorded and made accessible to agents. Customer information must be continually updated and stored for further reference. In a large organization it is often critical that all important communication events be made of record so that important information is not lost, and records of communication can be retrieved for many purposes. It is well understood that improved communication capabilities enhance a company's efficiency and profitability.

Due to large volume of communication events typically experienced by individuals who are selling to or servicing customers or clients of a large company, and the need to make record of such communication events, many companies have implemented what is known as contact management software. Contact management software allows sales/service agents and the like to efficiently store important information regarding contacts in a database for later review. Pertinent information may be entered into a contract management system and may be retrieved later at computer speeds thereby enabling an agent to increase efficiency related to his assigned tasks.

Contact management software typically combines functions from a word processor, a communications package, a calendar/scheduling program, and a database manager to manage information associated with day to day business. This functionality provides such capabilities as retrieving a day's or week's appointments, retrieving a client call-back list, updated reports on client activity, reminders concerning pending tasks, and so on. Customized versions of standard business letters may be generated for new clients, as well as a host of other types of tasks wherein merging and linking of different information is required.

There are several different versions of contact management software commercially available today that are tailored to different needs. Generally speaking, much training is required in the use of computer commands, input parameters and the like before an agent becomes proficient with such an application.

A neglected need in contact management has to do with commitments and fulfillment of commitments. Often, an agent or service representative makes a verbal or written commitment to a customer, client, or associate on behalf of himself or on behalf of another agent or service employee. In some large companies, this may be routine with numerous commitments made each day by numerous agents. It is, of course, desirable that the agent that made such commitments be able to fulfill them in a timely fashion. Failure to do so can erode a company's reputation. In a case wherein an agent makes a verbal commitment on behalf of another agent, then it is important that the fulfilling agent be notified in a timely manner. In a very fast-paced environment, it is extremely difficult to insure that verbal commitments to clients and the like are kept, or to track such commitments and ensure that appropriate action is taken. Often the agent who makes a commitment forgets the details of the commitment, or forgets to notify the appropriate agent on who's behalf the commitment was made.

A problem with conventional contact management software is that it does not appropriately address the issue of tracking client-specific and issue specific commitments and assigning them to appropriate agents with suitable notification and tracking. Notification events are typically limited to scheduled meetings, appointments, important time-sensitive tasks, and so on. Furthermore, present-art contact management applications do not have the capability of notifying agents over multiple media types such as E-mail, Voice mail and the like. Generally, the agent must access the contact management system to retrieve any information and generally, the accessed information is only accurate to the extent of the agent's original entry.

What is clearly needed is a method and apparatus for tracking contacts in an issue-specific manner, with facility for recording and storing commitments made by agents to clients, business contacts, or associates on their own behalf or on behalf of other agents, and then notifying all agents concerned before such time the commitment is to be fulfilled. Such a method and apparatus would significantly improve company communication both internally and externally thereby increasing efficiency and credibility.

SUMMARY OF THE INVENTION

In a preferred embodiment of the present invention, in a networked communication system, a method for recording and tracking client contacts on behalf of a host organization is provided, comprising steps of (a) storing the full content of communications to and from clients as entities in a multimedia database; (b) relating entities in the database by issue; and (c) displaying an object-oriented interface on a video display of the PC workstation, the interface characterized in that database entities may be recalled and displayed as objects in issue-related chronological strings. Full content of an entity displayed as an object may be reviewed through selecting the entity object in the display. Entities may include one or more of scanned documents displayable as text, e-mailed documents displayable as text, facsimile documents displayable as text, and recorded conversations reviewable as replayed audio from a digitally-stored entity, and essentially any other sort of storable contact communication.

In a further embodiment a step (d) is provided for initiating a response to a communication by a client by selecting an object in a response window in the interface, selectable objects including at least e-mail, voice message, facsimile, and a letter document. This step may further comprise recording a commitment related to the response selected, the commitment including identity of one or more persons assigned to fulfilling the commitment and a due time assignment for the commitment. Further the step may include notifying persons effected by commitments made one or more times before the commitment due time. Notifications may also be made relative to commitments met and fulfilled, and commitments not met and fulfilled.

In another aspect a system for recording and tracking client contacts on behalf of a host organization is provided, comprising a multimedia database adapted for storing the full content of communications to and from clients as database entities, the entities related in the database by issue; and an object-oriented interface on a video display of a PC workstation coupled to the multimedia database, the interface characterized in that database entities may be recalled and displayed as objects in issue-related chronological strings. Full content of an entity displayed as an object may be reviewed through selecting the entity object in the display. The entities may include one or more of scanned documents displayable as text, e-mailed documents displayable as text, facsimile documents displayable as text, and recorded conversations reviewable as replayed audio from a digitally-stored entity.

In an important aspect of the invention the interface further comprises a response window having selectable objects representing response choices, wherein a user may select an object to initiate a response to a client communication. Such response choices include at least e-mail, voice message, facsimile, and letter documents. There may also be a commitment function associated with the response window, wherein a user may enter a commitment related to the response selected, the commitment including identity of one or more persons assigned to fulfilling the commitment and a due time assignment for the commitment. In this aspect a commitment made associated with a response is recorded in the database, and the database notifies one or more persons associated with the commitment before the commitment due time. The database may also notify one or more persons including the person making the commitment, when the commitment is met and closed, and may notify one or more persons if the commitment is not met and closed.

In yet another aspect a multimedia call center is provided, comprising a plurality of agent stations, individual ones having a multimedia-capable personal computer with a video display unit (PC/VDU), and adapted for data network telephony (DNT); a local area network (LAN) connecting agent stations in the call center and connecting agent stations to one or more communication networks; and a multimedia database connected on the LAN. The database is adapted to store the full content of communications to and from clients as database entities, the entities related in the database by issue, and to display at individual PC/VDUs an object-oriented interface, the interface characterized in that database entities may be recalled and displayed as objects in issue-related chronological strings. Further the database may exhibit all of the features attributed above to the system of the invention.

In various embodiments it will be clear, given the descriptions provided below in enabling detail, that the system of the invention provides an apparatus and a method for recording and tracking commitments made in business transactions in a manner that enhances the probability that such commitments will be kept and fulfilled, and also provides an apparatus and method for dealing with clients in a professional manner having at hand the maximum available information, this being the full-content entities available from the multimedia database.

BRIEF DESCRIPTION OF THE DRAWING FIGURES

DESCRIPTION OF THE PREFERRED EMBODIMENTS

Figure 1:
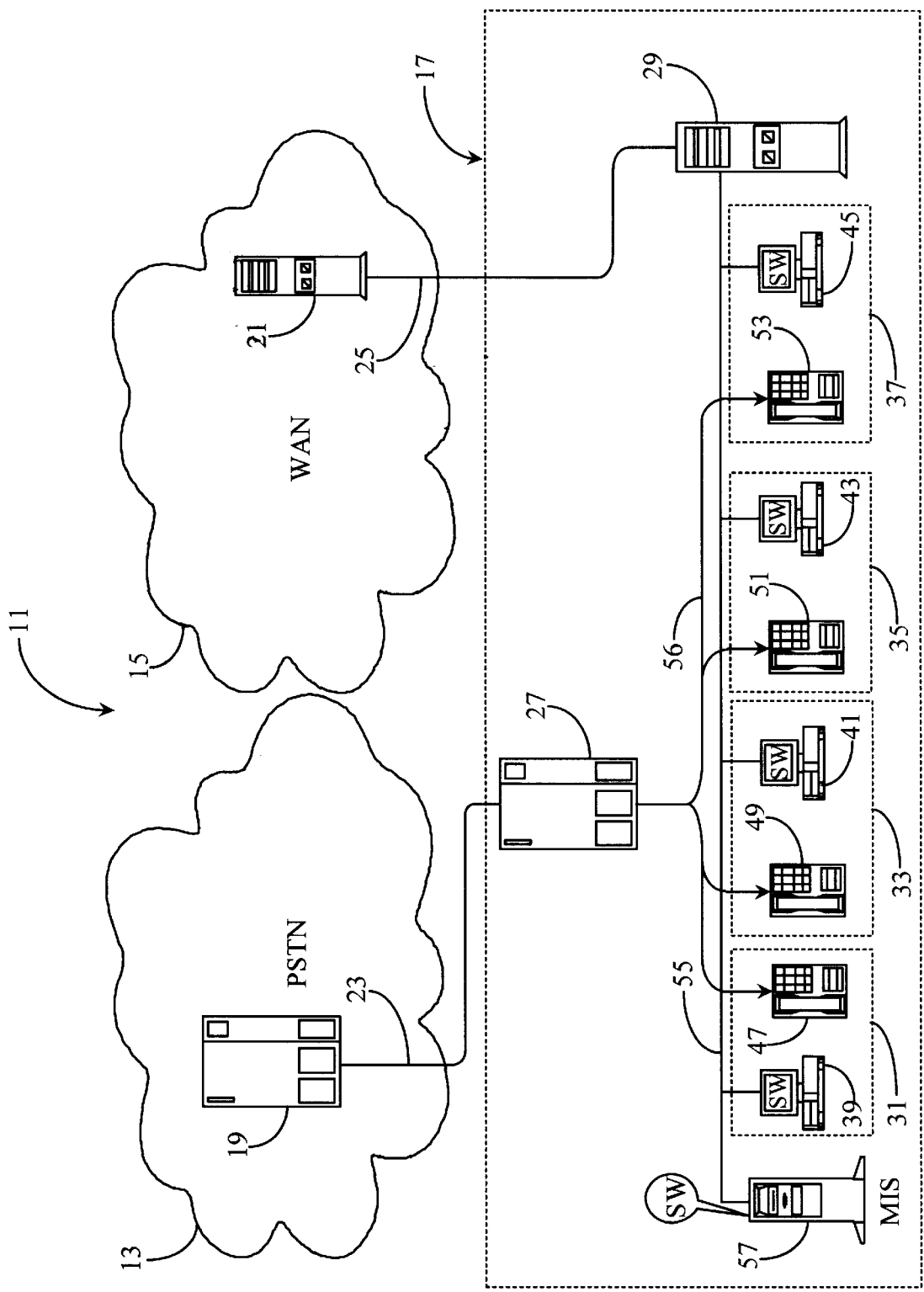
FIG. 1 is an overview of a call-center environment wherein commitment tracking and notification is practiced according to an embodiment of the present invention.

FIG. 1 is an overview of a typical call-center environment wherein commitment tracking and notification is practiced according to an embodiment of the present invention. A telephony-network architecture 11 comprises a company call center 17 that is linked to, in this example, both a publicly switched telephone network (PSTN) 13, and a wide area digital network (WAN) 15, which may be the public Internet or other digital network. In this particular embodiment call center 17 handles both conventional telephone calls, which may be categorized as connection-oriented, switched telephony (COST) calls, and data network telephony (DNT) calls, which may be DNT calls over a private digital network or calls according to a protocol such as the well-known Internet protocol. DNT calls are characterized in that data is transmitted as addressed data packets as opposed to dedicated connections in COST calls. As indicated, PSTN 13 may be a private rather than a public COST network. WAN 15 may be a company Intranet, the Internet, or another type of WAN known in the art.

Incoming COST calls arrive at a representative network-level telephony switching apparatus 19 in network cloud 13 and are connected over trunk 23 to a central telephony switching apparatus 27 within call center 17. From switching apparatus 27, calls are routed according to existing routing rules over internal wiring 56 to agents' telephones 47, 49, 51, and 53 residing at agents' workstations 31, 33, 35, and 37 respectively. Other equipment generally associated with computer integrated.telephony (CIT) networks such as CIT processors, routers, and the like are not shown here, but are assumed to be present in this embodiment, and may be connected to switching apparatus 27 and/or to a local area network 55 at the call center.

Incoming DNT calls, and other communication events such as E-mail, Voice mail and the like, arrive at a representative routing node 21 in WAN 15 and are passed on over representative digital connection 25 to routing node 29 within call center 17. Once calls arrive at node 29, they are routed over LAN 55 according to existing routing rules to personal computer/video display units (PC/VDU) such as PC/VDU 39, 41, 43, or 45 located at agent's workstations 31, 33, 35, and 37 respectively.

In the exemplary system and call center shown, the equipment and applications are adapted to provide for multimedia operation at each of the agent stations, so the agents can interact with clients in many different ways, as are known in the multimedia arts.

In a preferred embodiment of the present invention, each PC/VDU such as PC/VDU 39 residing in agent's workstation 31 is adapted to execute an instance of a contact tracking and notification application including commitment tracking according to an embodiment of the present invention. This application acts to enable an agent to track multimedia communication strings according to chronology, problems, issues, and/or other criteria, and enables an agent to enter relevant data during or immediately after a call or other communication event, and at other times as necessary. Pertinent data relating to transactions is entered in this example into multimedia information system (MIS) 57 (including a multimedia database) which is connected to LAN 55. For example, a letter may be scanned into MIS 57 or a fax, E-mail, word document, voice transaction, etc. may be mirrored into the database via methods known in the art. The client application also provides a response option box that is tailored to standard company-offered responses. By providing for the manipulation of standardized icons representing responses, the client interface is user-friendly allowing an agent to double click an icon for entering a response into the system. In some embodiments, however, typed commands may also be used in combination with icons or alone. Responses to communication events may either be commitments made in prior events or simply requested actions by the customer. Further detail of these functions is provided below.

A unique feature of the communication software in embodiments of the present invention is that it can automatically send time-sensitive notification of pending commitments to pertinent people connected in some manner to the database. For example, if a specific agent makes a commitment, notification can be made prior to a committed date and time to the agent who made the commitment, to an agent on who's behalf the commitment was made, to selected supervisors and auditors, to repair people, technicians and the like who may be involved, and more. Further, if a first agent who made the commitment is not available, then the application can look for a next best agent, based on skill set, that can fulfill the commitment.

Another important and unique feature of the commitment tracking and notification software in embodiments of the present invention is that multimedia interfacing is possible. For example, E-mail, Fax, I-phone, Voice mail and other media may be used by the tracking and notification software to send notifications to agents as long as their parameters are available to the system and the system has access to internal dialing functions, E-mail capabilities, and so on.

In the example provided herein a parent application resides and executes within MIS 57, and organizes and stores communication events. Events can be sorted, stored, and presented in a variety of ways. For example, in one embodiment communication history may be presented in a string or thread (order) that is unique to a particular customer. The customer may be a business comprising several different contacts, or may be an individual entity such as a buyer or seller. Internal entities such as high-level executives, project managers, and the like may also be entered into the database and have unique threads assigned to them. In this way correspondence and commitments both internal and external may be handled by the system. In another unique technique, communication events are presented in a string according to a particular problem or issue. For example, a representative of one company may call in with a problem. If this is the first call (introduction) of the problem (issue), an agent may assign an identifier to the problem or issue. Subsequent communication events and commitments relative to the same problem or issue may then be audited, tracked, and displayed, and notifications may be made, sorted by this particular problem or issue. More detail about the unique operation of the commitment tracking and notification software is provided below.

Figure 2:
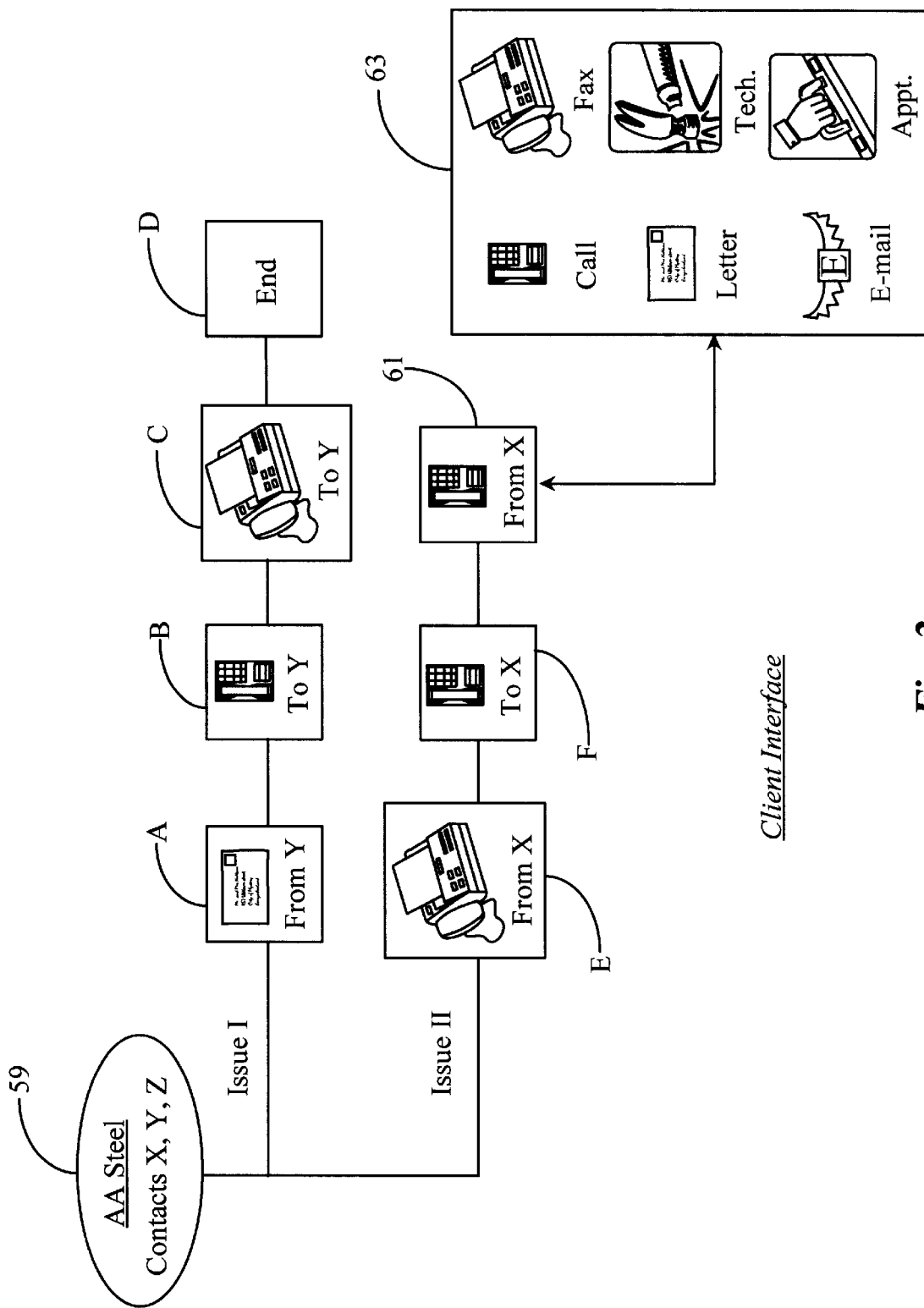
FIG. 2 is an exemplary agent interface of the commitment tracking and notification system according to an embodiment of the present invention.

FIG. 2 is a block diagram illustrating operation of the commitment tracking and notification system of a host organization according to an embodiment of the present invention. A client 59 of the host, in this example, AA Steel, has legitimate contact personnel X, Y, and Z listed as persons within AA Steel who are authorized to interact with the host organization. All information pertinent to doing business with customer 59 is entered into the multimedia database of the commitment tracking and notification software such as contact names, telephone numbers, fax numbers, E-mail addresses, shipping information, and so on.

As agents of the host at the call center interact with personnel of customer 59, communication events are entered into the database and organized by issue. All communication events that are related to a particular issue are assigned a thread that is unique to that issue. It will be apparent to those with skill in that art that such identifiers can be applied by flagging techniques and the like. For example, issue I is a thread connecting three communication events A, B, and C. All three events A, B, and C are about issue I which could be any issue ranging from a simple sales order to a complex engineering project. Because issues may be simple or complex as described above, the number of related communication events may vary accordingly.

An issue such as issue I is unresolved until all commitments made regarding issue I are fulfilled. Issue I is resolved for the present, but may have communication events and further commitments added on if for some reason the customer has additional requirements related to that same issue. It will be apparent to those with skill in the art that there is a broad choice for organization by issue, and clearly an issue must be named and assigned at an early stage in communication so contacts may be recorded by issue.

Referring again to FIG. 2, issue I shows a first communication event A being a letter received from contact Y, a second communication event B as a call placed to contact Y, and a third communication event C wherein a fax was sent to contact Y. Issue I is shown to have been satisfactorily resolved as represented by End Block D.

For example purposes event A may be a letter requesting a price quote for a certain product at various quantity levels. The letter was scanned and entered into the multimedia database of MIS 57 of FIG. 1. Event B is for example a response call verbally quoting the prices requested by contact Y in event A. During event B, an agent made a commitment to contact Y to fax a formal response containing a written quote. Call B is recorded digitally and entered into the database, connected by the issue string to event A. When the commitment was made, although not shown in the event string, the communication application of the invention allowed (and required) the agent making the commitment to enter the commitment, which was recorded as related to event B. At some point prior to event C the system notified the agent to compose and send the fax, which is Event C, as the formal fax response to the commitment made to contact Y in event B. When the fax was sent it was copied to the database in MIS 57 as event C. After the fax is sent, the agent elects to close the issue and the system reports that issue I is resolved as represented by End block D.

In the example shown, event strings may be selectively presented in the interface. That is, an agent may call up one issue for further action, or several issue, or may review all issues relative to a particular company. The nature of the multimedia database allows all communications to be recorded and reviewed by any agent or person with access. In an ongoing contact relative to Issue I, for example, an agent involved in call Y may double-click the icon representing the originating letter (event (A), and review the letter. Similarly, calls may be played back, e-mails reviewed, other letters perused and the like. This feature allows an agent and a client in contact to review and verify problems, opinions, promises, and the like, to better resolve and guide ongoing problem resolution, and to provide a complete audit trail of all contacts with clients for any purpose. In certain embodiments overall editing and purging capabilities are provided with suitable security and backup features, so the database can be suitably managed over time relative to old information and the like.

Communication events A, B, and C in the string representing Issue I represent actual events that have taken place. As an event may be a fulfillment of a commitment promised in a prior event, notification events (not recorded in this embodiment) would occur at scheduled time intervals between communication events. For example, during event B, an agent promised to send a fax response containing a formal price quote to contact Y. Perhaps, a time window of 24 hours was agreed upon between the agent and the client representative for formulating and sending the fax response. When the agent enters the proposed response as a commitment, by a feature of the invention described more fully below, the system records the commitment, and notifies the agent perhaps two hours before the commitment is due, and the nature of the commitment.

In alternative embodiments commitments may be made on a basis other than time, such as by availability, for example. A customer might desire to be notified when a new model of a product becomes available for sale. An agent makes such a commitment and enters the commitment I the database system. When information in the system indicates the new model is available for sale, the system will then notify appropriate personnel to notify the customer(s) and fulfill the commitment.

In the instant case relative to FIG. 2, a fax giving a price quote for a particular product in different quantities is required. This is the commitment made, with a time of 24 hours. It may be that the agent involved in call Y is not authorized to make such quotes, but another agent is. The commitment is then made for the authorized agent, who is then notified by the system that such a commitment has been made, and the agent to make the response is again notified as the time allotted nears expiration. Those with skill in the art will recognize that this exemplary situation is but one of many possibilities. Repair and troubleshooting visits to clients premises may, for example, be scheduled in this manner for repair technicians and the like. Virtually any sort of commitment and notification is possible, time-based, availability-based, or based on any other suitable criteria, according to business plans formulated and entered into the communication application according to communication facilities connecting the personnel of the host organization.

In the event a client contacts an agent about an ongoing issue, but does not have the reference number previously assigned to the particular issue, a search facility is provided so the agent may discover the correct string where new interaction is needed.

Referring now again to FIG. 2, an issue II has been created and a first communication event E concluded wherein a fax has been received from contact X of customer 59. The agent mirrored the faxed document, already in digital form, into the database thereby recording event E as shown, which the system displays as a fax icon. In various embodiments internal routines are employed to translate as needed between data protocols, and techniques such as text-to speech, character recognition, and the like may be employed. The agent then places a call to contact X in response to the faxed request. The agent mirrors the digital record of the call into the database creating event F. At a later time, a live call 61 is received from contact X regarding issue II. During call 61, the agent has opened a commitment interface 63, providing options for commitment and response. In one embodiment wherein multimedia events are received such as E-mail, DNT calls, faxes and the like, mirroring into the database may be automatic requiring no input from the agent.

Within client interface 63 there are several icons representing different response options. In this example there are six options: a call icon, a fax icon, a letter icon, a tech dispatch icon, an E-mail icon, and an appointment icon. The number of options for response is limited only by the capabilities and offered services of the organization. For example, icons representing multimedia communication indicate such capability attributed to the call center. Icons representing appointments or tech dispatches and the like may be linked to communication terminals at the effected departments for notification. To further illustrate, if call 61 is, for example, requesting a technician to come out to a job site, then the agent may double click on the tech icon opening up a list of current technicians on duty and their work loads. If a particular technician is free during the time requested by contact x, then the agent may select that technician, who will then be notified by the system of the commitment for scheduling purposes, and will again be reminded of the commitment before the due date and time, in sufficient time to allow a reasonable response.

The commitment tracking and notification software in combination with the appropriate hardware and additional software programs such as modem software, status reporting software, routing software, and the like can provide timed notification to third party personnel and track their performances.

Business routing rules could be applied to notification of commitments such that if a target agent is not available to fulfill a particular commitment, a next available agent (based on skill level) may be given notification to takeover the commitment. Commitment notifications may also be sent to more than one individual such as a list of involved persons. Perhaps supervisors could receive notification of the commitments made by their subordinates for performance evaluation purposes and so on.

It will be apparent to one with skill in the art that the commitment tracking and notification software may be tailored to many different environments such as sales, service, large engineering projects, etc. In a preferred embodiment the system is provided with an interface in a manner that a representative of the provider of the system may, in consultation with the potential user, may add or activate exactly those features needed by the user.

The multimedia capability of the software allows agents to eliminate time consuming data entry by simply mirroring fax documents, voice files, word documents, and the like into the database.

Figure 3:
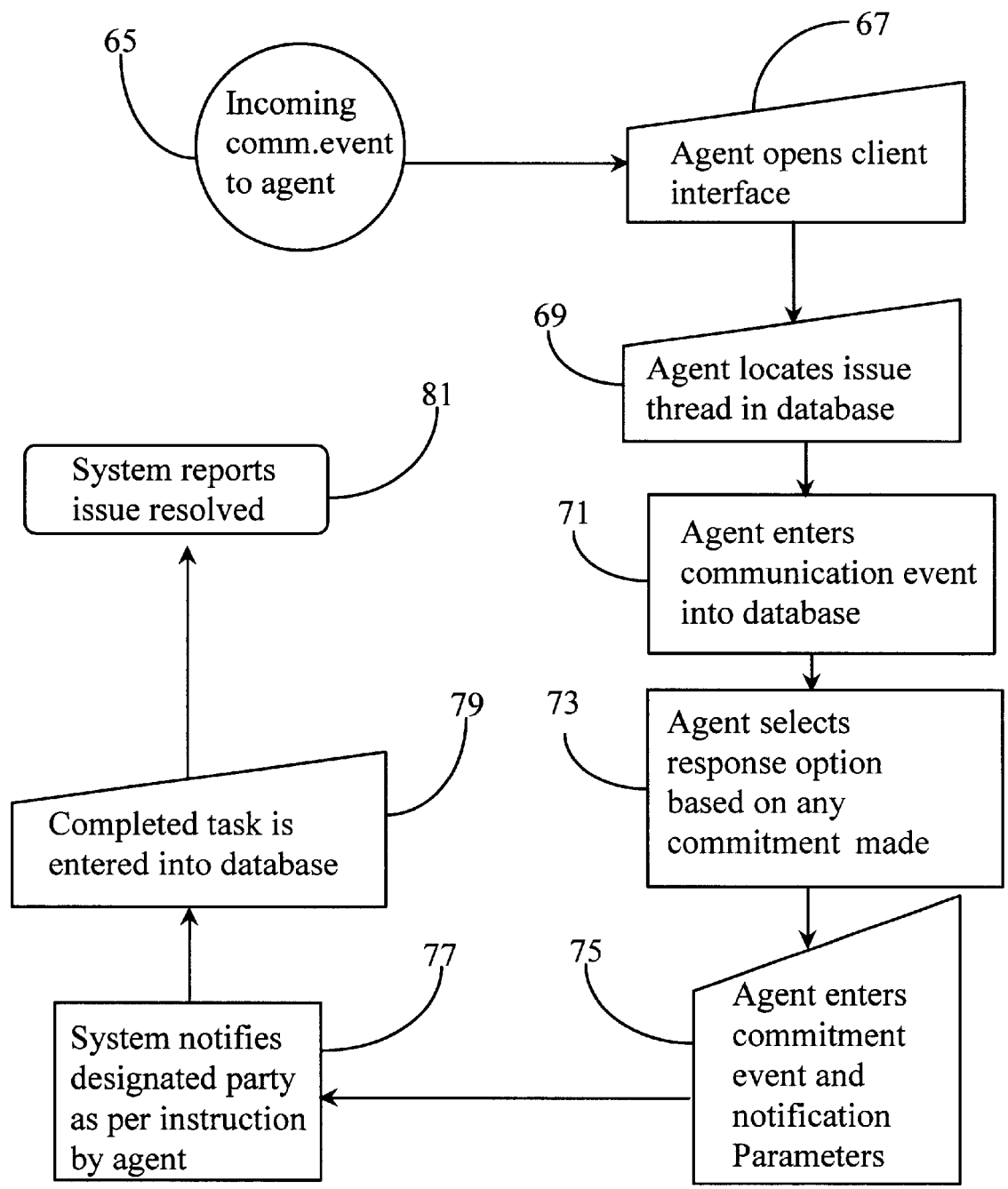
FIG. 3 is a work flow diagram illustrating basic steps of the commitment tracking and notification software according to an embodiment of the present invention.

FIG. 3 is a work flow diagram illustrating basic steps of the commitment tracking and notification software according to an embodiment of the present invention wherein an incoming communication event 65 begins the process. In step 67 the agent opens his client interface either during or immediately after discerning communication event 65. In many cases the client interface will already be open, or is always open. Communication event 65 may be a telephone call, a letter, a DNT call, a fax, an E-mail, or any other type of supported media as previously described. In step 69, the agent uses the client interface to access the multimedia database and locate the issue thread associated with event 65.

As previously described, event 65 may be a first communication regarding a new issue in which case a new identifier will be given to the contact, or event 65 may be an ongoing contact in an existing issue string. If event 65 is part of a resolved issue, it may be added on to the thread of the resolved issue, and the old issue may be resurrected. If the event is the next communication regarding an unresolved issue, it is added on as the next communication. If the contact does not know or remember the reference number assigned to the issue of event 65, then the agent may search for the issue via a search engine by entering an associated word string, and the like.

Referring again to FIG. 3, the agent enters event 65 into the multimedia database in step 71. This step may involve scanning in a letter, mirroring a fax or word document to the database, mirroring a voice file or digital phone record into the database, and so on. Because multimedia is supported by the commitment tracking and notification software, entry of communication events is much easier than would be the case with current art contact management software.

In step 73, the agent selects a response option based on a request by event 65 or based on a commitment made to the contact during event 65. For example, if event 65 was a letter requesting a fax back, then the agent would select a fax response. If event 65 was a call requesting a technician to be dispatched to a work site, then the agent selects a tech dispatch option and so on.

Once a response option is selected in step 73, an option is then presented to the agent in step 75 for entering notification parameters of the commitment and other associated parameters. For example, a dialog box containing notification parameters is presented so that the agent may assign the commitment and provide the suitable constraints, such as time or availability, for notification to the fulfilling party. In step 75, the agent may assign the commitment to himself or to other parties depending upon the type of commitment. In some cases, a simple fax response may suffice and the agent has the option of sending the fax now with no latter notification, or sending the fax at a later scheduled time and be notified prior to the scheduled event. In other cases, several individuals may be required to fill a commitment such as convening at a project site for a scheduled presentation by the contact. The possibilities are essentially unlimited.

After all of the necessary parameters are entered in step 75, the system notifies the party or parties assigned to the commitment, and again at a suitable time before the actual deadline of the commitment in step 77. This process is unique in that it takes into account known states of participating individuals making up a dynamic work force. For example, at the time of notification, one or more of the notified parties may not be available to fulfill the commitment promised to the contact. The reason may be that the agent is out of the area or that a designated person(s) are engaged in a priority situation overriding the prior commitment. By utilizing known information such as current skill levels and operational states of individuals that are logged on to the system, the system can reassign the commitment to a next best person(s) able to fulfill the commitment. Notification is then sent to the new designated individuals.

By linking the system to internal telephone networks, E-mail systems, and perhaps even wireless systems such as beeper systems or mobile units, the commitment and tracking software can send notification over any media type. This unique feature makes the system particularly useful where dispatching of mobile units is practiced such as with large construction projects and the like. A technician in the field may receive suitable notification for all of his scheduled stops.

Once a commitment has been fulfilled, the completed task must be entered into the database in step 79 so that the system may report the issue resolved in step 81. A fulfilled commitment may be a fax, or E-mail response, or some other final communication event. In this case, it is entered as a communication event on the issue thread and then the thread is closed by the individual fulfilling the final commitment or by the agent who initiated the commitment. In the event that the final commitment is a tech visit on site or the like, then the tech reports when the task is completed and a supervisor or individual charged with reviewing the technicians activities may enter a comment and close the thread. If the issue is subsequently called up for review, the system will report the issue resolved in step 81 as previously described.

In preferred embodiments the system of the invention is made adaptive, with overall tracking of data relative to commitments made, commitments fulfilled, notifications made, and the like. Success goals and ratios may be set by supervisors and administrators, related to notification levels and the like. For example, a commitment fulfillment threshold may be set such that, as long as the threshold is met, notification of unfulfilled commitments is only made to original committing agents and associated persons. If the threshold is not met by a first margin, supervisors are notified at a higher level. If performance deteriorates further, higher levels of management are notified and more strident alarms are sounded. In some embodiments, with deteriorating success of fulfillment, higher level notification of new commitments is also made, and more comprehensive and critical paths for tracking are automatically instituted. Such features are also provided in a modular manner so applications can be tailored to the needs of users of systems according to embodiments of the present invention.

It will be apparent to one with skill in the art that the method and apparatus of the present invention may be applied to any type of digital network-architecture such as LAN, WAN, wireless networks, etc. It will also be apparent to one with skill in the art that the system may be used with internal and external communications covering company projects, outside sales, dispatched technical teams, inventory operations and so on.

It will also be apparent to one with skill in the art that the commitment tracking and notification software may be integrated with routing software routines so that the system may reassign commitments to next best individuals who are known by the system to possess the required skill level to fulfill the commitment and are available at the time the commitment is to be filled. Furthermore, by tracking the nature and frequency of specific commitments to certain contacts over a period of time, a predictive notification process may be developed so that an agent may be alerted to a strong possibility of a pending request by the customer.

In one embodiment, data representing old business conducted before a specific period may be removed to archive on another storage device in order to save system memory. Also, the system may be scaled up by adding more memory for function and storage. There are many possible embodiments of which many have been noted. The present invention is limited only by the claims that follow.

What is claimed is:

1. In a networked communication system, a method for recording and tracking client contacts on behalf of a host organization, comprising steps of:
   (a) storing the full content of communications to and from clients as entities in a multimedia database;
   (b) relating entities in the database by issue; and
   (c) displaying an object-oriented interface on a video display of the PC workstation, the interface characterized in that database entities may be recalled and displayed as objects in issue-related chronological strings.

2. The method of claim 1 wherein full content of an entity displayed as an object may be reviewed through selecting the entity object in the display.

3. The method of claim 2 wherein entities include one or more of scanned documents displayable as text, e-mailed documents displayable as text, facsimile documents displayable as text, and recorded conversations reviewable as replayed audio from a digitally-stored entity.

4. The method of claim 1 further comprising a step (d) for initiating a response to a communication by a client by selecting an object in a response window in the interface, selectable objects including at least e-mail, voice message, facsimile, and a letter document.

5. The method of claim 4 wherein step (d) further comprises recording a commitment related to the response selected, the commitment including identity of one or more persons assigned to fulfilling the commitment and a due time assignment for the commitment.

6. The method of claim 5 wherein in step (d) the multimedia database is adapted to record a commitment made and to notify one or more persons associated with the commitment before the commitment due time.

7. The method of claim 6 further comprising a step (e) for notifying one or more persons when the commitment is met and closed.

8. The method of claim 7 wherein step (e) further comprises notifying one or more persons by the multimedia database when a commitment made and recorded is not met and closed.

9. A system for recording and tracking client contacts on behalf of a host organization, comprising:
   a multimedia database adapted for storing the full content of communications to and from clients as database entities, the entities related in the database by issue; and
   an object-oriented interface on a video display of a PC workstation coupled to the multimedia database, the interface characterized in that database entities may be recalled and displayed as objects in issue-related chronological strings.

10. The system of claim 9 wherein full content of an entity displayed as an object may be reviewed through selecting the entity object in the display.

11. The system of claim 10 wherein entities include one or more of scanned documents displayable as text, e-mailed documents displayable as text, facsimile documents displayable as text, and recorded conversations reviewable as replayed audio from a digitally-stored entity.

12. The system of claim 9 wherein the interface further comprises a response window having selectable objects representing response choices, wherein a user may select an object to initiate a response to a client communication.

13. The system of claim 12 wherein response choices include at least e-mail, voice message, facsimile, and letter documents.

14. The system of claim 12 further comprising a commitment function associated with the response window, wherein a user may enter a commitment related to the response selected, the commitment including identity of one or more persons assigned to fulfilling the commitment and a due time assignment for the commitment.

15. The system of claim 14 wherein a commitment made associated with a response is recorded in the database, and the database notifies one or more persons associated with the commitment before the commitment due time.

16. The system of claim 15 wherein the database notifies one or more persons including the person making the commitment, when the commitment is met and closed.

17. The system of claim 15 wherein the database notifies one or more persons if the commitment is not met and closed.

18. A multimedia call center, comprising:
   plurality of agent stations, individual ones having a multimedia-capable personal computer with a video display unit (PC/VDU), and adapted for data network telephony (DNT);
   a local area network (LAN) connecting agent stations in the call center and connecting agent stations to one or more communication networks; and
   a multimedia database connected on the LAN;
   wherein the database is adapted to store the full content of communications to and from clients as database entities, the entities related in the database by issue, and to display at individual PC/VDUs an object-oriented interface, the interface characterized in that database entities may be recalled and displayed as objects in issue-related chronological strings.

19. The call center of claim 18 wherein full content of an entity displayed as an object may be reviewed through selecting the entity object in the display.

20. The call center of claim 19 wherein entities include one or more of scanned documents displayable as text, e-mailed documents displayable as text, facsimile documents displayable as text, and recorded conversations reviewable as replayed audio from a digitally-stored entity.

21. The call center of claim 19 wherein the interface further comprises a response window having selectable objects representing response choices, wherein a user may select an object to initiate a response to a client communication.

22. The call center of claim 21 wherein response choices include at least email, voice message, facsimile, and letter documents.

23. The call center of claim 21 further comprising a commitment function associated with the response window, wherein a user may enter a commitment related to the response selected, the commitment including identity of one or more persons assigned to fulfilling the commitment and a due time assignment for the commitment.

24. The call center of claim 23 wherein a commitment made associated with a response is recorded in the database, and the database notifies one or more persons associated with the commitment before the commitment due time.

25. The call center of claim 24 wherein the database notifies one or-more persons including the person making the commitment, when the commitment is met and closed.

26. The method of claim 24 wherein the database notifies one or more persons if the commitment is not met and closed.

* * * * *